ized Mar. 26, 1957

2,786,868

METHOD OF SEPARATING SULFONATES FROM SOLUTIONS CONTAINING THEM

Gordon W. Duncan, Westfield, and Donald A. Guthrie, Elizabeth, N. J., assignors to Esso Research and Engineering Company, a corporation of Delaware No Drawing. Application June 26, 1953, Serial No. 364,500

16 Claims. (Cl. 260—504)

This invention relates to an improved method for separating metal organic sulfonates from solutions containing them. It particularly concerns a method for precipitating metal salts of hydrocarbon sulfonic acids from relatively dilute solutions of the salts and for recovering the salts in concentrated form.

The preparation and purification of various types of organic sulfonic acids and metal salts thereof is well known in the art. Hydrocarbon sulfonates are prepared by a number of procedures. For example, conventional petroleum aromatic sulfonates are obtained by treating a suitable aromatic-containing mineral oil fraction with concentrated sulfuric acid, neutralizing the resulting acid oil with soda, and extracting the sodium sulfonates from the solution with an isopropyl alcohol-water solvent. The sodium sulfonates may then be converted to alkaline earth metal salts by double decomposition with suitable reagents to form lubricant detergent additives and the like. Paraffinic sulfonates may be prepared by treating paraffins with sulfur dioxide and chlorine in the presence of light, followed by treating the resulting sulfonyl chloride with sodium hydroxide, for example, to form the sodium sulfonates. These and other methods are well known and need not be discussed in detail herein.

A disadvantage of these procedures is that rather complicated and expensive processing steps are needed to form concentrates of the sulfonates. Acid treating of most mineral oils, for example, will form solutions containing only about 5 to 15% sulfonic acids, and much higher concentrations of the salts are needed when they are to be used as wetting agents, lubricating oil additives, etc. The direct preparation of concentrated polyvalent metal sulfonates is difficult because conventional solvents are not effective for recovering such salts.

It is therefore a chief object of the present invention to provide a simple, direct and effective means for recovering metal sulfonates from relatively dilute solutions containing same. It is also an object to teach a method for separating metal sulfonates from a solvent in which the metal salts are dissolved. These and other objects of the invention will be illustrated in the following description and examples.

In accordance with the present invention, a solution comprising a metal organic sulfonate and an essentially hydrocarbon organic solvent is treated with a polyhydroxy compound. The metal sulfonate and hydroxy compound form an addition product or complex that is insoluble in the solvent and is readily separated therefrom by precipitation, centrifuging or by other means. The separated complex may then be decomposed to recover the metal sulfonate by water washing, by distilling off the polyhydroxy compound, or by other means. The recovered sulfonates may then be used as such or may be dissolved in a different organic solvent to form a concentrate having special uses. The recovered polyhydroxy compound may be reused in the process.

This procedure is quite effective for obtaining high yields of sulfonates, substantially quantitative recovery of sulfonates being obtained in one-stage treatment in many cases. It is not restricted to any particular type of metal salt; monovalent as well as polyvalent metal salts respond equally well to the treatment. Therefore, polyvalent metal salts such as calcium salts may be prepared directly in a dilute solution of sulfonic acids and then recovered by this process without resorting to the complicated two-step procedures of the prior art. The structure of the sulfonate-polyhydroxy compound complex is not known at this time. It appears to be a coordination type compound in which the metal portion of the sulfonate is tied to the complexing agent. This is indicated by the fact that sulfonic acids will not form such complexes and that in excess of one mol of polyhydroxy compound per mol of metal is needed to obtain effective recovery. It is not desired to be bound by any theoretical considerations regarding the type of complex formed.

The practice of the present invention will now be illustrated in detail by various specific examples giving preferred embodiments of the same. These examples are not intended however to limit the spirit and scope of the discloures other than as stated herein.

*Example 1.—Recovery of calcium petroleum sulfonates with ethylene glycol*

A. *Precipitation.*—A solution was formed consisting of 3% by weight of calcium petroleum sulfonates having an average molecular weight of about 1000 dissolved in 97% by weight of a mineral lubricant base stock. The sulfonates were derived from sulfonic acids formed by treating a Coastal lubricant distillate. To 3000 g. of this solution was added 60 g. (2% by weight) of ethylene glycol (amounting to about 7 mol of glycol per mol of calcium in solution), and the mixture was rapidly stirred at room temperature for 10 minutes by a conventional "Mixmaster." The emulsified mixture was then allowed to stand undisturbed for a period of 24 hours during which time a reddish, gum-like material settled to the bottom of the container. The supernatant oil phase, which was removed from the precipitate by decantation, was found by analysis to contain less than 0.1% ethylene glycol and 0.004% by weight ash. This corresponds to 99.3% removal of calcium sulfonate from the oil phase.

The recovered red gum complex weighed 160 g. and analyzed 10.8% by weight ash.

B. *Liberation of the sulfonate.*—79.7 g. of the red gum recovered in Part A was distilled under a nitrogen blanket at atmospheric pressure as shown in Table I, below:

TABLE I

| Time, Minutes | Vapor Temp., °C. | Bottoms Temp., °C. | Remarks |
|---|---|---|---|
| 0 | 135 | 185 | Very slow distillation. |
| 5 | 193 | 210 | Steady distillation. |
| 10 | 170 | 245 | Slow distillation. |
| 15 | 120 | 245 | Nitrogen blowing started. |
| 20 | 150 | 270 | Very slow distillation. |
| 25 | 140 | 310 | No more distillation. |

The still pot residue was then allowed to cool with nitrogen blowing and solidified to a heavy resinous mass. The residue weighed 48.5 g. and analyzed 19.15% ash representing a recovery of 100% of the calcium sulfonate from the complex. The distillate was water white and weighed 29.9 g. representing 100% recovery of the ethylene glycol.

It will be noted that the glycol started distilling at a temperature slightly below its boiling point (197° C.), but that most of the recovery took place at temperatures above 197° C. It is possible that a small amount of water was present in the glycol used in this experiment.

A portion of the above residue was tested as a detergent additive for mineral lubricating motor oil. It was found to be equivalent in performance to calcium sulfonates prepared and recovered by conventional procedures.

*Example 2.—Effectiveness of various hydroxy compounds as complexing agents*

A series of runs were carried out in which various mono- and polyhydroxy organic compounds were employed as complexing agents. In each test, a portion of a 1.5% solution of calcium petroleum sulfonate in mineral lubricant base stock having an S. U. S. viscosity of 47 at 210° F. had added to it 2 by weight, based on the solution, of a hydroxy compound. The mixture was then stirred for 10 minutes by a conventional "Mixmaster" at room temperature and settled for several days at room temperature. The supernatant oil was then decanted from the precipitated complex and analyzed for ash to obtain the degree of separation obtained. The results are shown in Table II below:

0.4 giving substantially complete recovery. The solid pentaerythritol was not effective under the conditions used because intimate contact between this compound and the sulfonate could not be obtained. With solid polyhydroxy compounds, higher treating temperatures and/or a solvent therefor is needed to give good results.

For a given molecular weight, an alpha glycol (e. g. butanediol-2,3) is a more efficient precipitant than, beta, gamma or other types (e. g. butanediol-1,4). The monohydroxy compounds, diethylene glycol monobutyl ether and butyl alcohol, were ineffective. A dihydroxy ether compound such as dipropylene glycol was more effective than a glycol having the same number of carbon atoms such as hexanediol-2,5. In general, it appears that polyhydroxy compounds having low oxygen to molecular weight ratios either do not react to completion, or form relatively soluble complexes, with the sulfonates.

Tests were also carried out in which several hydroxy aromatic compounds were employed as complexing agents. It was found that neither phenol nor resorcinol caused any precipitation to occur when used for treating hydrocarbon solutions of calcium petroleum sulfonates by the procedure outlined above.

*Example 3.—Recovery of sulfonate from propylene glycol complex*

In the run of Example 2 in which propylene glycol was used as a complexing agent, the top oil layer was decanted from the red gummy precipitate. The precipitate was distilled under 170 mm. of mercury vacuum using a nitrogen blanket for 20 minutes at 180° C. Substantially complete separation of sulfonate and glycol was obtained. A portion of the recovered calcium sulfonate was blended in a 28.6% by weight concentration in a mineral lubricant base stock. This concentrate had substantially the same physical characteristics as a 28.6 weight percent concentrate of the same sulfonate in the same base oil but prepared by conventional double decomposition of the sodium sulfonates with calcium chloride followed by treatment with lime.

*Example 4.—Recovery of various types of metal sulfonates*

A series of runs were carried out in which dilute

TABLE II

| Hydroxy Compound | No. of Hydroxy Groups | Oxygen to Molecular Weight Ratio in Hydroxy Compound | Mols Hydroxy Compound per Mol of Calcium Used in Treatment | Ash in Supernatant Oil, Wt. Percent | Calcium Sulfonate Precipitated From Oil, Wt. Percent |
|---|---|---|---|---|---|
| None (Oil plus Sulfonate) | | | | [1] 0.32 | |
| Glycerol | 3 | 0.522 | 9.2 | 0.01 | 100 |
| Ethylene Glycol | 2 | 0.516 | 13.7 | 0.02 | 97 |
| Pentaerythritol [2] | 4 | 0.470 | 6.2 | 0.30 | 6.5 |
| Propylene Glycol | 2 | 0.421 | 11.1 | 0.02 | 97 |
| Dipropylene Glycol | 2 | 0.358 | 6.3 | 0.17 | 48 |
| Butanediol-2,3 | 2 | 0.356 | 9.4 | 0.13 | 61 |
| Butanediol-1,4 | 2 | 0.356 | 9.4 | 0.27 | 16 |
| Diethyleneglycol, monobutyl ether | 1 | 0.296 | 5.2 | 0.31 | 3.2 |
| Polypropylene Glycol [3] | | 0.296 | 0.4 | 0.27 | 16 |
| Hexanediol-2,5 | 2 | 0.271 | 7.2 | 0.28 | 13 |
| n-Butyl Alcohol | 1 | 0.216 | 11.4 | 0.31 | 0 |

[1] Base oil contained 0.01 weight percent ash.
[2] Solid at treating temperature.
[3] Average molecular weight—2000.

From these data it is seen that polyhydroxy compounds having an oxygen to molecular weight ratio of above about 0.3 give substantial sulfonate recoveries, ratios above mineral oil solutions of various types of metal sulfonates were treated with 2 weight percent ethylene glycol using the general treating conditions set forth in Example 2.

Table III presents data on the source of the sulfonates and the results of the glycol treatments:

particular application to the so-called "oil-soluble" sulfonates, particularly the petroleum sulfonates.

TABLE III

| Type of Metal Sulfonate Tested | | | Analysis of Mineral Oil-Sulfonate Solution Treated | | Mols Ethylene Glycol Per Mol of Metal in Treating Step | Results of Ethylene Glycol Treatment | |
|---|---|---|---|---|---|---|---|
| Source of Sulfonic Acid Constituent | Metal Constituent | Molecular Weight | Sulfonate Concentration, Wt. Percent | Original Ash Content of Oil Blend, Wt. Percent | | Ash in Supernatant Oil, Wt. Percent | Metal Sulfonate Precipitated From Oil, Wt. Percent |
| 1. Naphthenic Base Mineral Lubricant Distillate.[1] | Calcium | 1,016 | 1.46 | 0.30 | 16.0 | 0.02 | 93 |
| 2. Naphthenic Base Light Mineral Lubricant Distillate.[1] | do | 748 | 1.44 | 0.46 | 9.8 | 0.04 | 91 |
| 3. Paraffinic Base Mineral Lubricant Distillate.[1] | do | 780 | 1.36 | 0.38 | 11.7 | 0.01 | 97 |
| 4. Alkyl Benzenes [2] | Sodium | 430 | 1.46 | 0.24 | 10.5 | 0.01 | 96 |
| 5. Alkyl Benzenes [2] | Calcium | 913 | 1.45 | 0.34 | 13.6 | 0.02 | 94 |
| 6. Alkyl Benzenes [2] | Barium | 815 | 1.47 | 0.82 | 10.0 | 0.27 | 67 |
| 7. Alkyl Naphthalene [3] | Calcium | 950 | 1.61 | 0.29 | 12.0 | 0.02 | 93 |
| 8. Solvent Extracted Naphthenic Base Mineral Lubricant Distillate.[4] | do | 1,017 | 1.15 | 0.27 | 12.6 | 0.02 | 93 |

[1] Aromatic-type sulfonic acids giving oil-soluble petroleum sulfonates.
[2] Benzene alkylated with $C_9$-$C_{12}$ polypropylenes and polybutylenes.
[3] Naphthalene alkylated with $C_9$ polypropylene.
[4] Formed by treating oil with $SO_2$ and chlorine in presence of light and then neutralizing. Sulfonate groups attached to aliphatic molecules.

Effective separation of metal sulfonate and oil was obtained regardless of whether the hydrocarbon portion of the sulfonate was aromatic or aliphatic in character. The type of metal constituent did not affect the extent of recovery to any appreciable extent.

*Example 5.—Effect of molar ratio of complexing agent to metal constituent*

A series of tests were carried out to determine the effect of increasing molar ratio of ethylene glycol to metal in treating oil solutions of either calcium or barium petroleum sulfonates. The treating procedure of Example 2 was used. Results are shown in Table IV.

TABLE IV

| Sulfonate-Oil Solution | Amount of Ethylene Glycol, Wt. Percent | Mols Glycol Per Mol of Metal | Amount of Sulfonate Removed From Oil, Wt. Percent |
|---|---|---|---|
| 1.5% Solution of High Alkalinity Calcium Petroleum Sulfonate in Mineral oil | 0.07 | 0.5 | 0 |
| | 0.15 | 1.0 | 0 |
| | 0.22 | 1.5 | 30 |
| | 0.30 | 2.0 | 50 |
| | 0.59 | 4.0 | 90 |
| | 1.05 | 7.0 | 93 |
| | 1.48 | 10.0 | 93 |
| | 2.22 | 15.0 | 93 |
| | 4.44 | 30.0 | 90 |
| | 8.88 | 60.0 | 93 |
| 1.5% Solution of Barium Petroleum Sulfonate in Mineral Oil | 0.6 | 2.7 | 61 |
| | 1.0 | 4.7 | 52 |
| | 1.5 | 6.6 | 64 |
| | 2.3 | 10.0 | 65 |

In excess of one mol of glycol per mol of metal is needed to obtain some separation with calcium sulfonates. About 4 mols glycol per mol of metal gave effective separation, and this was not substantially improved when using up to a 60:1 ratio. Barium sulfonate was somewhat more difficult to separate than the calcium compound.

The metal sulfonates may be derived from a wide variety of organic sulfonic acids, whether aliphatic or aromatic. Such sulfonic acids include wax sulfonic acids, naphthene sulfonic acids, benzene sulfonic acids, m-chlorbenzenesulfonic acid, p-toluene-sulfonic acid, 2,4-xylenesulfonic acid, phenolsulfonic acid, m-benzenedisulfonic acid, toluene-2,4-disulfonic acid, petroleum sulfonic acids, and the like. Essentially hydrocarbon sulfonic acids are preferred, although non-interfering substituent groups and atoms such as halogen, hydroxyl, sulfur, nitrogen and the like may be present in the molecule. The invention has The metal constituent of the sulfonate may be any of the mono- and polyvalent metals known to the art for preparing such salts or soaps. These include the alkali metals such as sodium, lithium, and potassium; the alkaline earth metals such as calcium, barium, strontium and magnesium; and other polyvalent metals such as lead, tin, zinc, aluminum, copper, cadmium, mercury, vanadium, chromium, molybdenum, manganese, iron, cobalt and nickel. The salts or soaps are usually formed by reacting the sulfonic acid with basic inorganic compounds such as the hydroxides, hydrated oxides or oxides, carbonates and the like. Although a polyvalent salt may be prepared from an alkali metal salt by metathesis, this invention has particular application to a situation in which any salt is directly prepared in a solution and is then separated in concentrated form. The salts may be substantially neutral or may be rendered alkaline by treatment with excess neutralizing agents in accordance with well-known prior art procedures.

The organic solvent in which the metal sulfonate is dissolved is a normally liquid material at the treating conditions and is preferably a hydrocarbon. Mineral oils such as light hydrocarbons including hexane, petroleum ether, gasoline fractions and the like or heavier fractions such as kerosene, gas oil fractions, lubricant distillates and the like are particularly suitable. Other essentially hydrocarbon solvents such as synthetically produced hydrocarbons including polymerized olefins are also suitable. Non-hydrocarbon solvents including the halogenated hydrocarbons such as carbon tetrachloride, chloroform, etc. are usually unsuitable for use in this invention.

The mixture of metal sulfonate and solvent may result from a number of sources. As a general rule, the solvent will be the medium from which the sulfonic acid is derived; i. e., when hydrocarbon fractions are treated with sulfuric acid to form a dilute solution of sulfonic acids followed by neutralization. In other cases a solvent of a different character to the source of sulfonates may be used as the medium in which the sulfonation and/or neutralization is carried out. In still other cases, a solvent may be used to extract sulfonates from a complex mixture, following which the sulfonates must be removed from the solvent. The sulfonate-solvent solution may contain very little sulfonate, i. e., in the range of 0.1 to 10%, or may be much more concentrated, i. e., up to 50% or more of sulfonate.

In the preparation of petroleum sulfonates in which the acid material is neutralized to form the metal sulfonate, the mixture frequently contains undesirable solids, such as inorganic salts, unreacted neutralizing agent and the like. These solids may be removed by filtration before proceeding with the complexing step. In this connection quite viscous solutions may be filtered more readily by following the teachings of Chechot et al. in U. S. Patent 2,401,614, in which a small amount of an alcohol, glycol or glycol ether is added to the solids-containing material to be treated according to the present invention. These hydroxy compounds lower the viscosity of the solution and are not added in amounts sufficient to cause precipitation of the sulfonate. The filtered material is then treated with the desired polyhydroxy compound in an amount sufficient to cause precipitation of the sulfonate. Other procedures may be used to remove objectionable materials before proceeding with the precipitation step.

The polyhydroxy organic compounds used as complexing agents in the present invention may be any suitable compound or mixtures of compounds having two, three, four or more hydroxyl groups that will form a complex with the metal sulfonate that is insoluble in the solvent medium. The polyhydroxy compound need not be soluble in the solvent, but it is preferably liquid at the treating temperature so that it may be brought into intimate contact with the sulfonate. These compounds are preferably aliphatic and alicyclic alcohols having at least two hydroxyl groups. The hydrocarbon portion of the molecule may be straight chain or branched. Compounds containing ether linkages between carbon atoms may be used, but are less preferred than the hydroxy compounds per se. The compounds may have relatively low, medium or high molecular weights, but those having relatively high oxygen to molecular weight ratios, e. g. above 0.3, and particularly about 0.4, give best results, and are especially preferred. The polyhydroxy compound may contain some water providing the amount is insufficient to interfere with the formation of the insoluble precipitate.

In addition to the polyhydroxy compounds listed in the examples, other suitable compounds include 1,2-butanediol, erythritol, erythrol, diethylene glycol, triethylene glycol, 1,2-cyclopentanediol, polyethylene glycols having molecular weights as high as 6000 or higher, etc. Ethylene and propylene glycols and glycerol are preferred because of their effectiveness, availability and relatively low cost. Aromatic polyhydroxy compounds are generally less preferred than the non-aromatic types.

In order to obtain effective separation, in excess of one mol of polyhydroxy compound should be used per mol of metal in the sulfonate. Preferably a ratio of at least 2:1, more preferably about 4:1, such as up to about 20:1 or higher, should be used to obtain effective separation. However, the ratio needed will depend to some extent on the type of glycol and metal sulfonate being used.

The treating step is conveniently carried out by thoroughly mixing the sulfonate solution and complexing agent in a suitable container at room temperature although lower or higher temperatures such as in the range of about 40° to 300° F., preferably 50° to 150° F., may be used. The upper temperature is limited by the temperature at which the complex precipitate will form, and the treating temperature should be low enough to give a good yield of precipitate. The mixing step may be carried out mechanically using stirrers or beaters, and the formation of an emulsion-like mixture is desired to obtain intimate contact.

The insoluble complex is separated from the solvent medium by centrifuging or settling in a relatively quiescent state. The solvent phase may then be decanted off of the complex phase or may be removed by other means. If the mixture is highly viscous, separation is facilitated by adding a light solvent such as hexane. The supernatant solvent may be treated with complexing agent in several stages if necessary to obtain complete recovery of sulfonate.

The separated complex, which is usually a gummy, viscous material, may be decomposed by heat, by water washing or by other suitable means. Distillation at atmospheric or reduced pressures is preferred, substantially quantitative separation of the metal sulfonate and polyhydroxy compound being obtained in this manner. The recovered complexing agent may be reused for treating additional quantities of sulfonate-solvent mixtures. The recovered metal sulfonate may be used as such or may be blended in concentrated form in a suitable solvent for storage, shipment and use.

Although this invention has particular application to the recovery of sulfonates, it is also a useful analytical tool. For example, to determine the metal sulfonate concentration in an oil solution, one may separate the sulfonates by the procedure described under standard conditions, and measure the amount of recovered complex, the difference in weight of the complex and complexing agent giving a measure of sulfonate recovered.

What is claimed is:

1. A method for separating metal sulfonate from a solution comprising same and a solvent which comprises treating said solution with a polyhydroxy organic compound selected from the group consisting of glycols and glycerol in an amount sufficient to form a complex of said sulfonate and said polyhydroxy organic compound, said complex being insoluble in said solvent, and separating said complex from said solvent, said metal sulfonate being selected from the group consisting of alkali metal sulfonates and alkaline earth metal sulfonates.

2. A method as in claim 1 wherein said separated complex is decomposed and said metal sulfonate is recovered.

3. A method as in claim 1 wherein in excess of one mol of said polyhydroxy organic compound per mol of metal in said sulfonate is used.

4. A method for recovering metal hydrocarbon sulfonate from a solution of same and a hydrocarbon solvent which comprises mixing said solution with a polyhydroxy organic compound selected from the group consisting of glycols and glycerol to form an insoluble complex of said sulfonate and said polyhydroxy organic compound, separating said complex from said solvent, and decomposing said complex into its component parts, said metal sulfonate being selected from the group consisting of alkali metal sulfonates and alkaline earth metal sulfonates.

5. A method as in claim 4 wherein at least two mols of said polyhydroxy organic compound per mol of metal in said sulfonate is mixed with said solution.

6. A method as in claim 5 wherein said complex is decomposed by heat.

7. A method for recovering metal hydrocarbon sulfonates from a solution containing same dissolved in a mineral oil solvent which comprises mixing said solution and a polyhydroxy organic compound selected from the group consisting of glycols and glycerol, the weight ratio of oxygen to molecular weight of said polyhydroxy organic compound being at least 0.3, to form an insoluble complex of said metal sulfonate and polyhydroxy organic compound, separating said complex from said solvent, and recovering metal sulfonate from said complex by heating same at a decomposition temperature and distilling off said polyhydroxy organic compound, the mol ratio of said polyhydroxy organic compound to said metal being in excess of about 2:1, said metal sulfonate being selected from the group consisting of alkali metal sulfonates and alkaline earth metal sulfonates.

8. A method as in claim 7 wherein the weight ratio of oxygen to the molecular weight of said polyhydroxy organic compound is at least 0.4.

9. A method as in claim 8 wherein said polyhydroxy organic compound is glycerol.

10. A method as in claim 8 wherein said polyhydroxy organic compound is ethylene glycol.

11. A method as in claim 8 wherein said polyhydroxy organic compound is propylene glycol.

12. A method for recovering oil-soluble alkaline earth metal aromatic sulfonates from a mineral oil solution containing same which comprises intimately contacting said solution with a polyhydroxy organic compound selected from the group consisting of glycols and glycerol, said polyhydroxy organic compound having a weight ratio of oxygen to molecular weight of at least 0.4, the mol ratio of said polyhydroxy organic compound to said metal being in the range of about 4:1 to 20:1, separating the resulting insoluble complex of metal sulfonate and polyhydroxy organic compound from said solution, and distilling said polyhydroxy organic compound from said complex at above the decomposition temperature thereof.

13. A method as in claim 12 wherein said aromatic sulfonate is a petroleum sulfonate.

14. A method as in claim 13 wherein said alkaline earth metal is calcium.

15. A method for recovering oil-soluble calcium petroleum sulfonate from a dilute mineral lubricating oil solution containing same which comprises intimately contacting said solution with ethylene glycol, employing a mol ratio of said glycol to calcium in excess of about 4:1, at a temperature in the range of about 50° to 150° F., separating the resulting insoluble calcium sulfonate-ethylene glycol complex from said mineral oil, and distilling ethylene glycol from said complex at an elevated temperature.

16. A method for recovering oil-soluble calcium petroleum sulfonates from a dilute mineral oil solution containing same which comprises intimately contacting said solution with glycerol, employing a mol ratio of glycerol to calcium in excess of about 4:1, at a temperature in the range of about 50° to 150° F., separating the resulting insoluble calcium sulfonate-glycerol complex from said mineral oil, and distilling glycerol from said complex at an elevated temperature.

UNITED STATES PATENTS

References Cited in the file of this patent

| | | |
|---|---|---|
| 2,459,995 | Duncan et al. | Jan. 25, 1949 |
| 2,465,221 | Gilbert | Mar. 22, 1949 |
| 2,467,118 | Duncan et al. | Apr. 12, 1949 |
| 2,585,520 | Van Ess et al. | Feb. 12, 1952 |
| 2,617,049 | Asseff et al. | Nov. 4, 1952 |
| 2,676,995 | Stewart et al. | Apr. 27, 1954 |